(12) United States Patent
Watanabe et al.

(10) Patent No.: US 7,302,262 B2
(45) Date of Patent: Nov. 27, 2007

(54) MOBILE COMMUNICATIONS CONTROL METHOD, CONTROL SYSTEM AND MOBILE TERMINAL

(75) Inventors: Yugo Watanabe, Yokohama (JP);
Masashi Yamashita, Yokosuka (JP);
Satoshi Hiyama, Yokohama (JP);
Shoichi Hirata, Fuchu-chi (JP)

(73) Assignee: NTT DoCoMo, Inc., Tokyo (JP)

( * ) Notice: Subject to any disclaimer, the term of this patent is extended or adjusted under 35 U.S.C. 154(b) by 171 days.

(21) Appl. No.: 10/820,700

(22) Filed: Apr. 9, 2004

(65) Prior Publication Data

US 2004/0203777 A1 Oct. 14, 2004

(30) Foreign Application Priority Data

Apr. 10, 2003 (JP) ............................. 2003-106197

(51) Int. Cl.
*H04Q 7/20* (2006.01)

(52) U.S. Cl. ................... 455/435.1; 455/435.2

(58) Field of Classification Search ............. 455/435.1, 455/435.2, 433, 450, 452.1, 452.2, 464, 509, 455/422.1, 550.1, 403, 414.1; 370/328, 329, 370/310, 332
See application file for complete search history.

(56) References Cited

U.S. PATENT DOCUMENTS

| | | | |
|---|---|---|---|
| 5,841,854 A * | 11/1998 | Schumacher et al. .. | 379/265.11 |
| 6,091,953 A * | 7/2000 | Ho et al. ..................... | 455/433 |
| 6,151,309 A * | 11/2000 | Busuioc et al. ............ | 370/328 |
| 6,272,315 B1 * | 8/2001 | Chang et al. .............. | 455/13.1 |
| 6,801,777 B2 * | 10/2004 | Rusch ..................... | 455/452.2 |
| 2002/0039892 A1 * | 4/2002 | Lindell ..................... | 455/151.1 |
| 2002/0101858 A1 * | 8/2002 | Stuart et al. ................ | 370/352 |
| 2004/0203907 A1 * | 10/2004 | Hiller et al. ............. | 455/456.1 |
| 2005/0239443 A1 * | 10/2005 | Watanabe et al. ........ | 455/414.1 |
| 2006/0149854 A1 * | 7/2006 | Rudkin et al. .............. | 709/241 |

FOREIGN PATENT DOCUMENTS

| | | |
|---|---|---|
| CN | 1257634 A | 6/2000 |
| WO | WO 98/48585 | 10/1998 |

OTHER PUBLICATIONS

Q. Tian, et al., IEEE Wireless Communications Network and Networking Conference, pp. 753-758, "Location Management in a Heterogeneous Network Environment", 2000.
G. Wu, et al., IEEE Communications Magazine, pp. 126-134, "Mirai Architecture for Heterogeneous Network", Feb. 2002.
Y.-B. Lin, et al., IEEE Communications Magazine, pp. 106-112, "Heterogeneous Personal Communications Services: Integration of PCS Systems", Sep. 1996.
M. Stemm, AGM Mobile Networking, pp. 1-29, "Vertical Handoffs in Wireless Overlay Networks", 1998.
Patent Abstracts of Japan, JP 6-260990, Sep. 16, 1994.

* cited by examiner

*Primary Examiner*—Jean Gelin
(74) *Attorney, Agent, or Firm*—Oblon, Spivak, McClelland, Maier & Neustadt, P.C.

(57) ABSTRACT

A mobile communications control method of this invention controls mobile communication by a mobile terminal in a network in which a plurality of wireless systems are available. In the mobile communications control method, the mobile terminal performs location registration with a wireless system selected from among the wireless systems, based on at least one of a status of the network, a status of the mobile terminal, location information of the mobile terminal, a frequency of incoming call reception of the mobile terminal, and service area information of the wireless systems.

5 Claims, 11 Drawing Sheets

PRIOR ART

| MOBILE TERMINAL ID | LOCATION INFORMATION | LOCATION REGISTRATION AREA INFORMATION | GROUP | PREFERRED WIRELESS SYSTEM | SPECIFIC INFORMATION TRANSMISSION CONDITION |
|---|---|---|---|---|---|
| 090-aaaa-aaaa | X1 | LA_A | 1 | FIRST WIRELESS SYSTEM | a (HOME) |
| 090-bbbb-bbbb | X2 | LA_B | 2 | SECOND WIRELESS SYSTEM | b (OFFICE) |
| .... | .... | .... | .... | .... | .... |

| PRIORITY | ITEM |
|---|---|
| 1 | TERMINAL STATUS |
| 2 | SPECIFIC INFORMATION |
| 3 | USER INFORMATION |
| 4 | SERVICE AREA INFORMATION |

FIG. 12

MOBILE COMMUNICATIONS CONTROL METHOD, CONTROL SYSTEM AND MOBILE TERMINAL

CROSS REFERENCE TO RELATED APPLICATION

This application is based upon and claims the benefit of priority from the prior Japanese Patent Application No. P2003-106197, filed on Apr. 10, 2003; the entire contents of which are incorporated herein by reference.

BACKGROUND OF THE INVENTION

1. Field of the Invention

The present invention relates to a mobile communications control method and control system for controlling mobile communications by mobile terminals in a network in which a plurality of wireless systems are available, and a mobile terminal used therein.

2. Description of the Related Art

Wireless systems conventionally known include cellular systems such as Personal Digital Cellular (PDC) Telecommunication Systems and International Mobile Telecommunications-2000 (IMT-2000), wireless LAN systems such as IEEE802.11a/b, and Bluetooth (registered trademark).

For higher-speed and larger-volume communications in cellular systems, research and development on fourth-generation systems (4G cellular systems) has been conducted. For wireless LAN systems, standardization on IEEE.802.11g and the like has been conducted. Also, research and development on new wireless systems such as Ultra Wideband (UWB) has been conducted. Given these situations, wireless systems will be increasingly diversified in the future.

Figure 1:
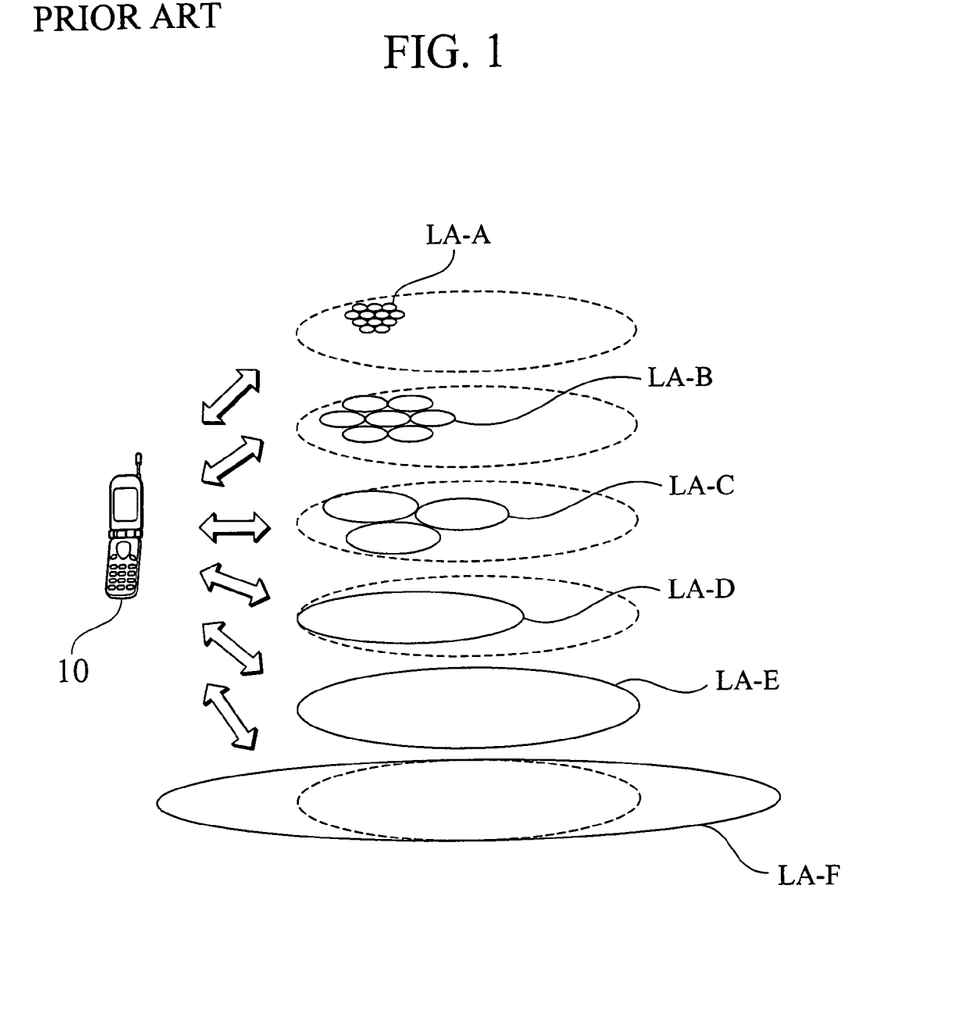
FIG. 1 is a schematic diagram of a Beyond IMT-2000 mobile communications system.

FIG. 1 illustrates a Beyond IMT-2000 mobile communications system in which service areas LA_A to LA_F of multiple wireless systems A to F overlap one another in a single physical area.

It is envisioned that the Beyond IMT-2000 mobile communications system will include a multimode mobile terminal 10 capable of mobile communications in a wireless system A, Bluetooth system B, wireless LAN system C, 4G cellular system D, 3G cellular system E, wireless system F and so on.

In this context, development on multimode mobile terminals compliant with multiple wireless systems has also been actually promoted. PHS/PDC dual terminals have already been developed. PDC/IMT-2000 dual terminals, IMT-2000/IEEE802.11b dual terminals and so on are expected to appear in the future. Study on software radio technology has also been actively conducted.

As shown in the following non-patent documents 1, 2, 3, and 4 and patent document 1, study on location registration control (location control) in networks having a plurality of wireless systems has conventionally been conducted.

[Non-patent Document 1] Qing Tian, Donald C. Cox (Stanford Univ.), "Location Management in a Heterogeneous Network Environment", IEEE Wireless Communications and Networking Conference (WCNC) 2000.

[Non-patent Document 2] Gang Wu, Mitsuhiko Mizuno (Communication Research Laboratory), Paul J. M. Havinga (University of Twente, Netherlands), "MIRAI Architecture for Heterogeneous Network", IEEE Communication Magazine, February 2002.

[Non-patent Document 3] Yi-Bing Lin (National Chaio Tung Univ.), Imrich Chlamtac (Boston Univ.), "Heterogeneous Personal Communications Services: Integration of PCS Systems", IEEE Communication Magazine, September 1996.

[Non-patent Document 4] Mark Stemm, Randy H. Katz (U.C. Berkeley), "Vertical Handoffs in Wireless Overlay Networks", ACM Mobile Networking (MONET), 1998.

[Patent Document 1] Japanese Patent Application No. H06-260990.

The technique disclosed in the non-patent document 1 focuses on matters related to a location management database, and the technique does not make detailed description on location registration control in networks having a plurality of wireless systems.

In the technique disclosed in the non-patent document 2, a wireless control system, called a Basic Access Network (BAN), commonly used by a plurality of wireless systems performs location registration control.

Therefore, there is a problem in that a wireless system to perform the location registration control of a specified mobile terminal is thus fixed, and it is impossible to choose an optimum wireless system with which the mobile terminal performs the location registration.

In the technique disclosed in the non-patent document 2, when a wireless system used for paging is different from a wireless system used for communication, it is necessary to activate an interface of the wireless system used for communication after paging, resulting in a possible delay in starting communication.

The technique disclosed in the non-patent document 3 integrates multiple Personal Communication Systems (PCSs), and envisages two cases, location registration by a mobile terminal with only one wireless system and location registration with multiple wireless systems. However, there is a problem in that no consideration is given to the choice of an optimum wireless system to perform location registration control of the mobile station.

The technique disclosed in the non-patent document 4 relates to a method of selecting an optimum wireless system during communication to switch a wireless system for use (Vertical Handoff). In this method, there is a problem in that a wireless system can be switched only during communication, and before initiating communication, a wireless system cannot be switched.

The patent document 1 discloses, as a method of selecting a wireless system by a multimode mobile terminal, a method of selecting a wireless system in a better radio environment, when the radio environment of a different wireless system is deteriorated.

Also, the patent document 1 discloses, as a method of selecting a wireless system by a multimode mobile terminal, a method of selecting a wireless system based on priority uniformly predetermined for all mobile terminals in a network in which multiple wireless systems are available.

The patent document 1, however, does not disclose a method of selecting an optimum wireless system for each mobile terminal.

Generally, different wireless systems have different characteristics and different advantages and disadvantages. For example, cellular systems excel in mobility management, area coverage and battery saving. On the other hand, they have difficulty in providing high transmission rates.

Wireless LAN systems excel in the provision of high transmission rates. On the other hand, they provide hot-spot-like area coverage, having difficulty in dealing with high-speed mobility of terminals, and are unfavorable in battery saving.

The above-described conventional techniques do not allow for controlling mobile terminal location registration in a network in which a plurality of wireless systems are available, effectively utilizing the characteristics of the plurality of wireless systems.

Figure 2:
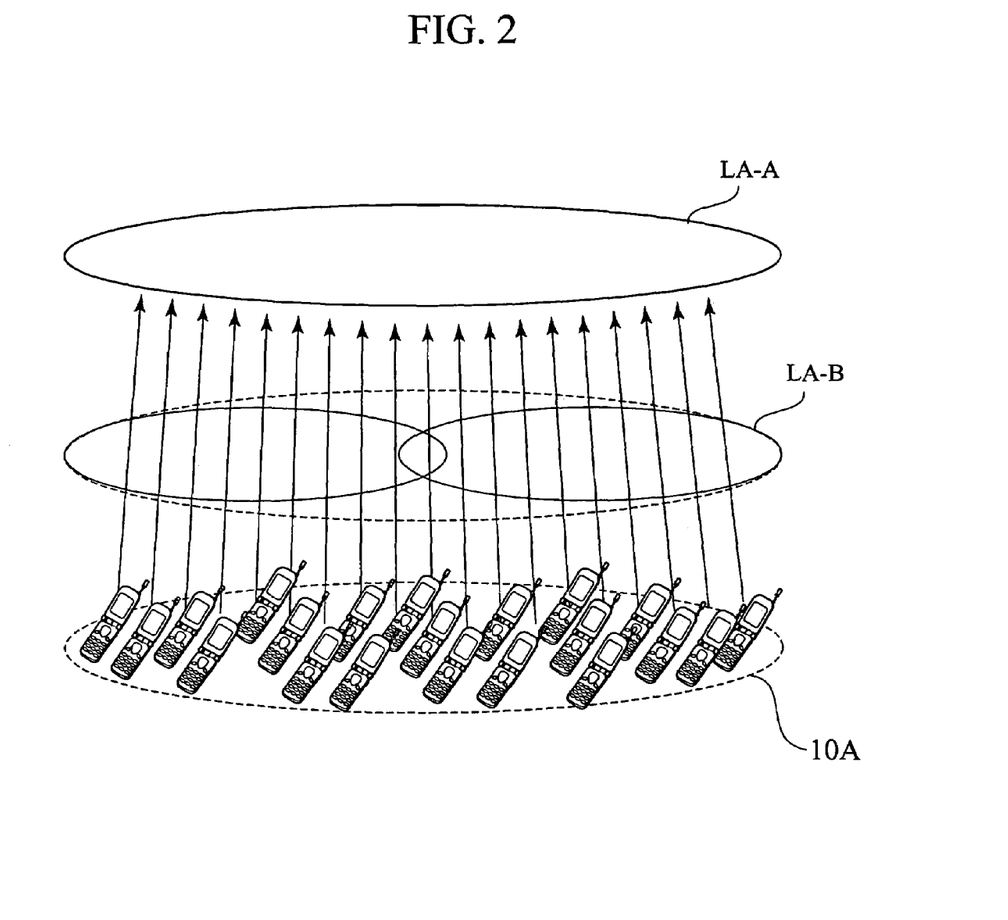
FIG. 2 is a diagram illustrating the problem of a mobile communications system according to a conventional art.

According to the above conventional techniques, when a service area LA_A of a first wireless system A overlaps a service area LA_B of a second wireless system B in a single physical area as shown in FIG. 2, all mobile terminals included in a mobile terminal group 10A perform location registration with either of the first wireless system A or the second wireless system B, or the mobile stations perform location registration with a wireless system for controlling location registration. There is thus a possibility of traffic concentration on a single wireless communication system.

Also, according to the above conventional techniques, a wireless system with which a mobile terminal performs location registration is fixedly selected. When there is an incoming call to the mobile terminal, calling is performed via the fixedly selected wireless system. There is thus a possibility in that an optimum wireless system as a wireless system for use cannot be selected at the start of communication.

In this case, there is a possible method of selecting a wireless system different from a selected wireless system at the start of communication. This method, however, requires a number of steps of selecting an optimum wireless system, securing a communications channel and so on, before actually initiating communication, resulting in a potential problem of delay before the start of communication.

Even when a wireless system providing a hot-spot-like service area such as a wireless LAN system is detected, a mobile terminal moving at a high speed is located in the service area for a short time. If the mobile terminal does not establish communication or does not finish communication while located in the service area, such a problem can occur that location registration should not have been performed with the wireless system.

BRIEF SUMMARY OF THE INVENTION

The present invention has been made in view of the above problems, and has an object of providing a mobile communications control method, a control system and a mobile terminal which allow for the selection of an optimum wireless system with which a mobile terminal performs location registration.

A first aspect of the present invention is summarized as a mobile communications control method of controlling mobile communication by a mobile terminal in a network in which a plurality of wireless systems are available.

The mobile communications control method has a step of selecting, from among the wireless systems, a wireless system with which the mobile terminal performs location registration, based on at least one of a status of the network, a status of the mobile terminal, location information of the mobile terminal, a frequency of incoming call reception of the mobile terminal, and service area information of the wireless systems.

A second aspect of the present invention is summarized as a control system for controlling mobile communication by a mobile terminal in a network in which a plurality of wireless systems are available. The control system has a selector and an instructor.

The selector is configured to select, from among the wireless systems, a wireless system with which the mobile terminal performs location registration, based on at least one of a status of the network, a status of the mobile terminal, location information of the mobile terminal, a frequency of incoming call reception of the mobile terminal, and service area information of the wireless systems. The instructor is configured to instruct the selected wireless system to the mobile terminal.

A third aspect of the present invention is summarized as a mobile terminal for mobile communication in a network in which a plurality of wireless systems are available. The mobile terminal has a selector and a location registration controller.

The selector is configured to select, from among the wireless systems, a wireless system with which to perform location registration, based on at least one of a status of the mobile terminal, location information of the mobile terminal, a frequency of incoming call reception of the mobile terminal, and service area information of the wireless systems. The location registration controller is configured to perform location registration with the selected wireless system.

A fourth aspect of the present invention is summarized as a mobile terminal for mobile communication in a network in which a plurality of wireless systems are available. The mobile terminal has a memory and a selector.

The memory is configured to store specific information and a wireless system, associating them with one another. The a selector is configured to select the wireless system associated with the specific information, as a wireless system with which to perform location registration, when the specific information is transmitted together with broadcast information from a control system for controlling the network.

DETAILED DESCRIPTION OF THE INVENTION

First Embodiment of the Invention

A mobile communications system for implementing a mobile communications control method according to a first embodiment of the present invention will be described with reference to FIGS. 3 to 7.

Figure 3:
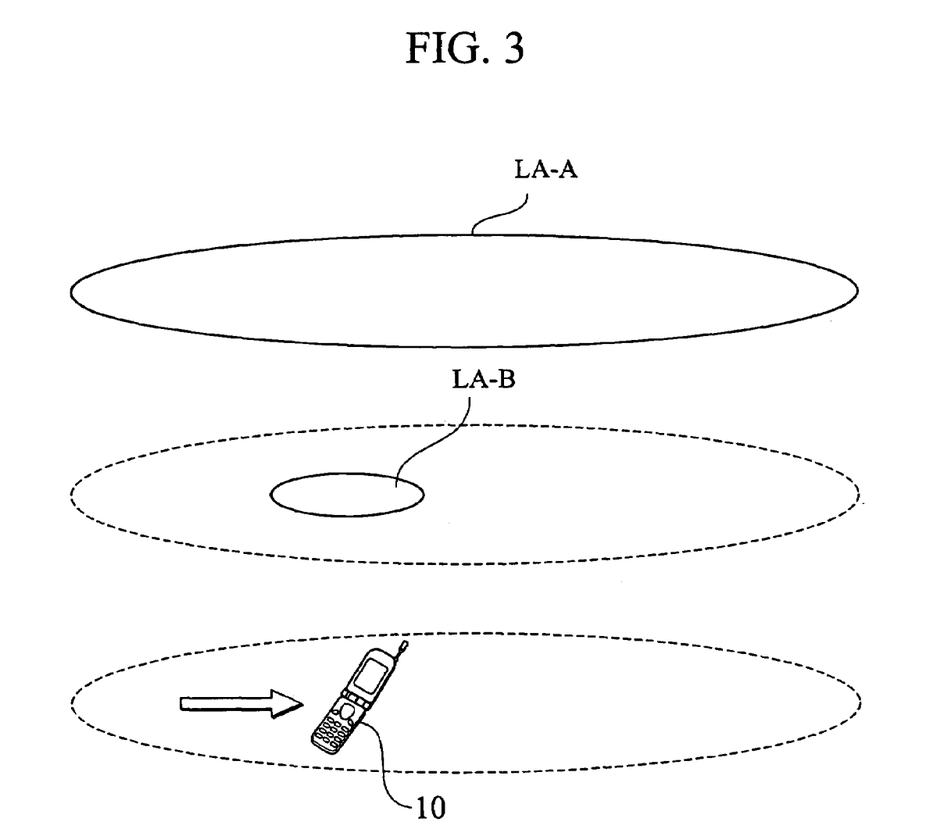
FIG. 3 is a diagram illustrating the application of a mobile communications system according to first to fourth embodiments of the present invention.

FIG. 3 is a diagram illustrating a communications environment containing multiple wireless systems (a first wireless system A and a second wireless system B in this embodiment).

FIG. 3 illustrates that a service area LA_A of the first wireless system A overlaps a service area LA_B of the second wireless system B in a single physical area in which a mobile terminal (multimode mobile terminal) 10 is moving at a high speed.

Here, suppose that the first wireless system A is a cellular system which excels in mobility management, area coverage and battery saving but has difficulty in providing high-speed communication services, and the second wireless system B is a wireless LAN system which is capable of providing high-speed communication services but provides hot-spot-like area coverage, having difficulty in coping with the high-speed movement of the mobile terminal 10, and is unfavorable in battery saving.

Figure 4:
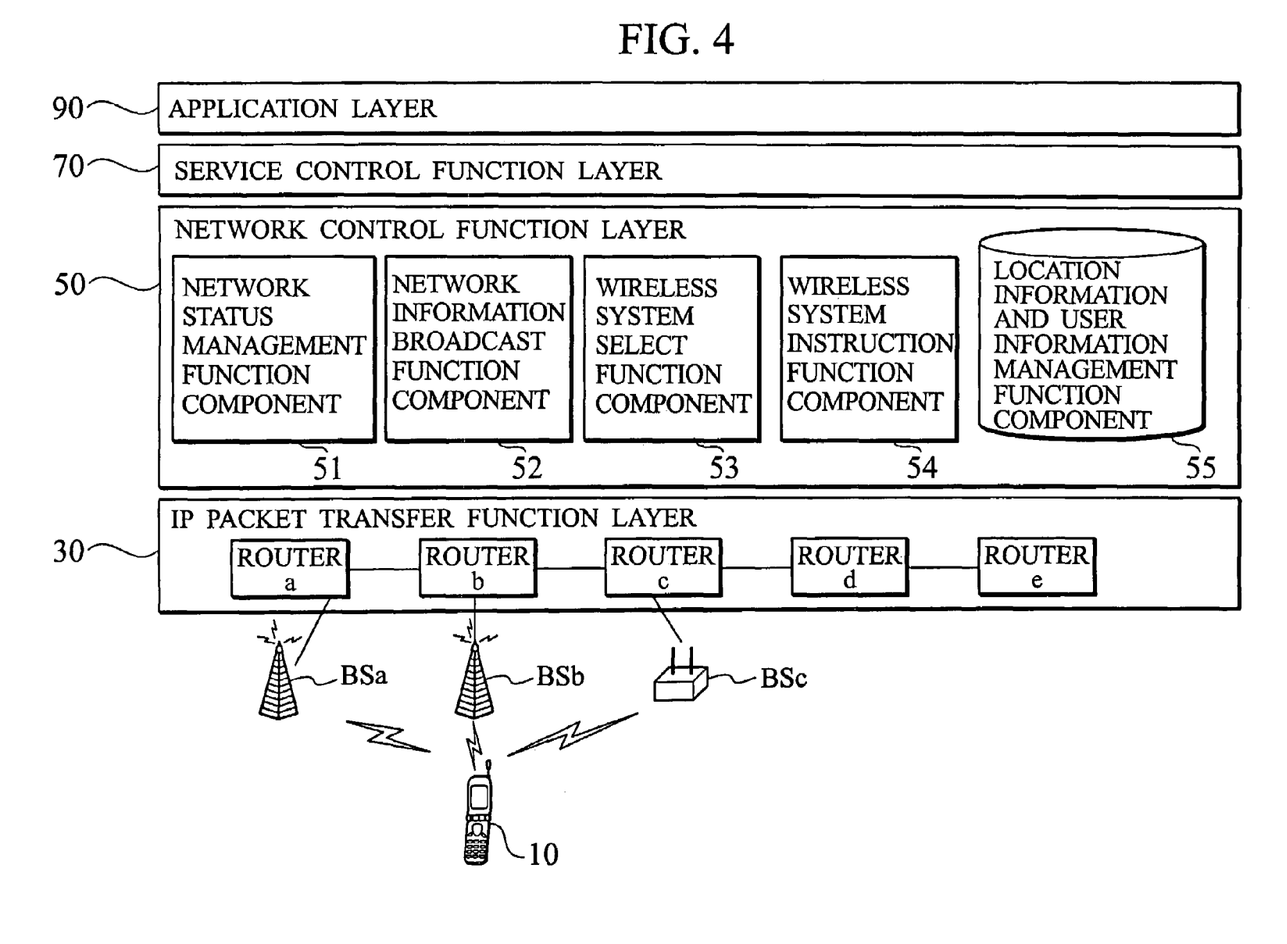
FIG. 4 is a functional block diagram of the mobile communications system according to the first to fourth embodiments of the present invention.

FIG. 4 illustrates functional blocks of the mobile communications system according to this embodiment. The mobile communications system of this embodiment controls mobile communication by the mobile terminal 10 in a network in which a plurality of wireless systems (first to third wireless systems) are available.

As shown in FIG. 4, the mobile communications system of this embodiment includes at least one mobile terminal 10, a base station BSa of the first wireless system, a base station BSb of the second wireless system, a base station BSc of the third wireless system, an IP packet transfer function layer 30, a network control function layer 50, a service control function layer 70, and an application layer 90.

The IP packet transfer function layer 30 includes a plurality of routers "a" to "e" having the function of transferring IP packets transmitted from the mobile terminal 10 and IP packets destined for the mobile terminal 10.

The service control function layer 70 is a group of devices (nodes) having the function of controlling services provided by the mobile communications system.

The application layer 90 is a group of devices (nodes) storing applications required for providing services in the mobile communications system.

The network control function layer 50 is a group of control devices (nodes) having the function of controlling the network in which a plurality of wireless systems (first to third wireless systems) are available.

The network control function layer 50 includes a network status management function component 51, a network information broadcast function component 52, a wireless system select function component 53, a wireless system instruction function component 54, and a location information and user information management function component 55.

The network status management function component 51 manages a status of the network (network status) such as traffic status (e.g., congestion status) and failure status reported from base stations of the wireless systems.

The network status management function component 51 notifies the wireless system select function component 53 of the network status it manages in predetermined timing.

The network information broadcast function component 52 instructs the base stations BSa to BSc to transmit specific information together with broadcast information under predetermined conditions.

Alternatively, the network information broadcast function component 52 may be incorporated in each of the base stations BSa to BSc, so as to transmit specific information together with broadcast information under predetermined conditions.

Here, the broadcast information includes location registration area information and service area information.

The location registration area information is information for identifying a location registration area and a wireless system managing the location registration area.

The service area information gives the extent (such as a diameter) of a service area, an available transmission rate and so on.

The specific information is information for use in changing a wireless system with which the mobile terminal 10 performs location registration (e.g., information showing the location of the mobile terminal 10).

The specific information may be transmitted in the form of being included in a given portion of the broadcast information or may be transmitted in the form of being attached to the broadcast information.

The wireless system select function component 53 is configured to select a wireless system with which the mobile terminal 10 performs location registration, from among the first to third wireless systems.

To be more specific, the wireless system select function component 53 select the wireless system, based on at least one of the network status, a status of the mobile terminal (to be described below), location information of the mobile terminal, a frequency of incoming call reception of the mobile terminal, and the service area information of each wireless system.

Here, the status of the mobile terminal (mobile terminal status) includes a movement speed of the mobile terminal 10 and remaining battery life.

The network status is managed by the network status management function component 51. The frequency of incoming call reception (incoming call frequency) of the mobile terminal is managed by the location information and user information management function component 55.

The wireless system select function component 53 can select a wireless system different from a wireless system specified in a location registration request from the mobile terminal 10.

Alternatively, the wireless system select function component 53 may be configured to determine that a wireless system with which the mobile terminal 10 performs location registration should be changed, instead of selecting a wireless system with which the mobile terminal 10 performs location registration, based on at least one of the network status, the mobile terminal status, the location information of the mobile terminal, the incoming call frequency of the mobile terminal, and the service area information of each wireless system.

Alternatively, the wireless system select function component 53 may be configured to select a wireless system with which mobile terminals 10 of a given group (a mobile terminal group 10A) perform location registration, from among the first to third wireless systems, based on the network status managed by the network status management function component 51.

The wireless system instruction function component 54 is configured to instruct the mobile terminal 10 of a wireless system (the first or second wireless system) selected by the wireless system select function component 53, via the IP packet transfer function layer 30 and the base stations BSa to BSc.

Alternatively, the wireless system instruction function component 54 may be configured to instruct a mobile terminal 10 selected by the wireless system select function component 53 to change a wireless system with which the mobile terminal 10 performs location registration.

The location information and user information management function component 55 manages the location information of the mobile terminal 10 (such as "location information" and "location registration area information" to be described below) and user information of the mobile terminal (such as "group", "preferred wireless system" and "specific information transmission condition" to be described below).

The location information and user information management function component 55 is configured to manage mobile terminals 10 in groups.

Figure 5:
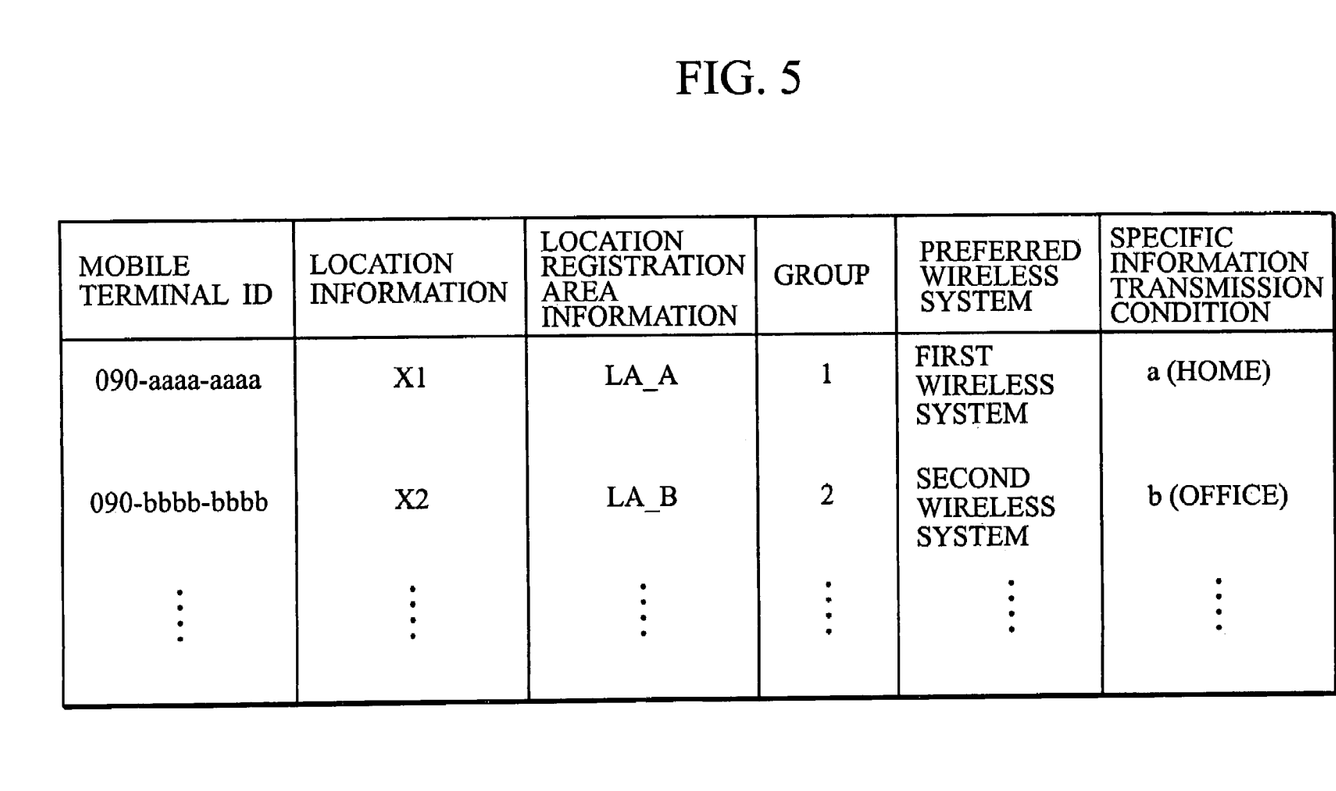
FIG. 5 is a diagram exemplarily illustrating a location information and user information management function component of a control system in the mobile communications system according to the first to fourth embodiments of the present invention.

Specifically, the location information and user information management function component 55 stores, as shown in FIG. 5, "mobile terminal ID", "location information", "location registration area information", "group", "preferred wireless system" and "specific information transmission condition", associating them with one another.

"Mobile terminal ID" is mobile terminal ID such as a subscriber's telephone number of each mobile terminal 10.

"Location information" is location information of the mobile terminal such as location information managed by GPS satellites.

"Location registration area information" is information for identifying service areas in which the mobile terminals 10 have performed location registration.

In the example of FIG. 5, a mobile terminal identified by "090-aaaa-aaaa" performs the location registration to the service area LA_A of the first wireless system A. A mobile terminal identified by "090-bbbb-bbbb" performs the location registration to the service area LA_B of the second wireless system B.

"Group" is information for identifying each group to which mobile terminals are assigned based on given rules. The group assignment may be done according to whether the last numbers of mobile terminal IDs are odd or even.

"Preferred wireless system" indicates wireless systems with which the mobile terminals 10 preferentially perform location registration. For example, "preferred wireless system" may be determined based on individual preferences such as communication charge.

"Specific information transmission condition" shows conditions on which the base stations BSa to BSc transmit the specific information together with the broadcast information.

In the example of FIG. 5, specific information transmission condition "a" indicates that the specific information should be transmitted to the mobile terminal 10, when it is determined that the user of the mobile terminal 10 is at home based on the location information and the like of the mobile terminal 10.

The specific information transmission condition "b" indicates that the specific information should be transmitted to the mobile terminal 10, when it is determined that the user of the mobile terminal 10 is in an office based on the location information and the like of the mobile terminal 10.

This embodiment has been described with the function parts 51, 52, 53, 54 and 55 provided in different units, but the present invention is not limited thereto. Some of or all of the function parts may be provided in a single unit.

Figure 6:
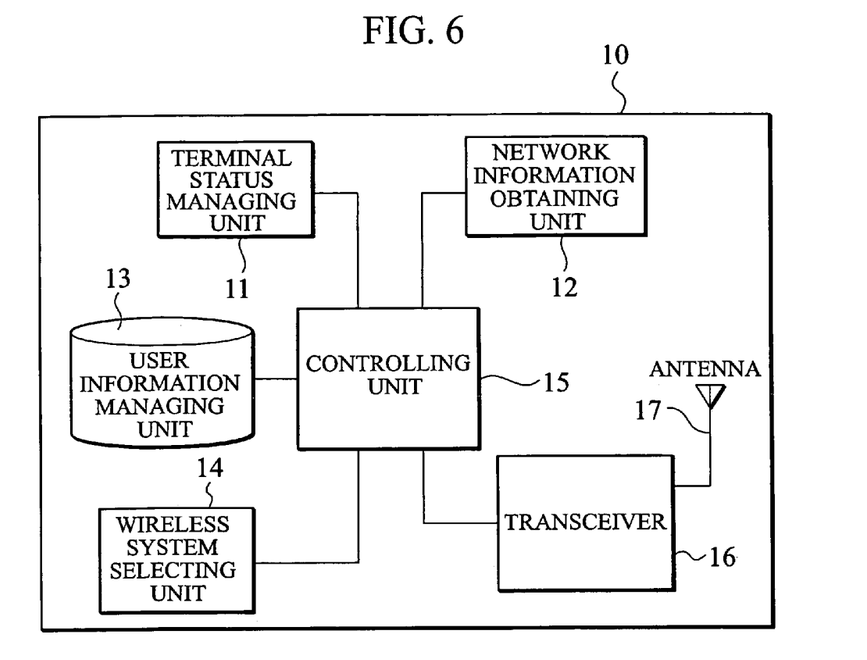
FIG. 6 is a functional block diagram of a mobile terminal in the mobile communications system according to the first to fourth embodiments of the present invention.

The mobile terminal 10 is a multimode mobile terminal capable of performing mobile communications in a network in which a plurality of wireless systems (the first to third wireless systems) are available.

As shown in FIG. 6, the mobile terminal 10 includes a terminal status managing unit 11, a network information obtaining unit 12, a user information managing unit 13, a wireless system selecting unit 14, a controlling unit 15, a transceiver 16 and an antenna 17.

The terminal status managing unit 11 is configured to manage the mobile terminal status such as a movement speed of the mobile terminal 10 and remaining battery life.

The network information obtaining unit 12 is configured to obtain the location registration area information and the service area information, from the broadcast information transmitted from the base stations BSa to BSc of the wireless systems in predetermined timing.

The network information obtaining unit 12 can obtain the specific information transmitted from the base stations BSa to BSc of the wireless systems.

The user information managing unit 13 is configured to manage the location information of the mobile terminal 10, the location registration area information of the mobile terminal 10, the group ID of the mobile terminal 10, information regarding a preferred wireless system of the mobile terminal 10, a frequency of incoming call reception of the mobile terminal 10, and so on.

The user information managing unit 13 can store the specific information obtained by the network information obtaining unit 12 and a wireless system with which the location registration should be performed when the specific information is received, associating them with one another.

The user information managing unit 13 can manage priority which shows which one of the mobile terminal status, the location information of the mobile terminal, the incoming call frequency of the mobile terminal, the service area information of the wireless system and the so on should be preferentially used when selecting a wireless system with which to perform location registration.

Figure 7:
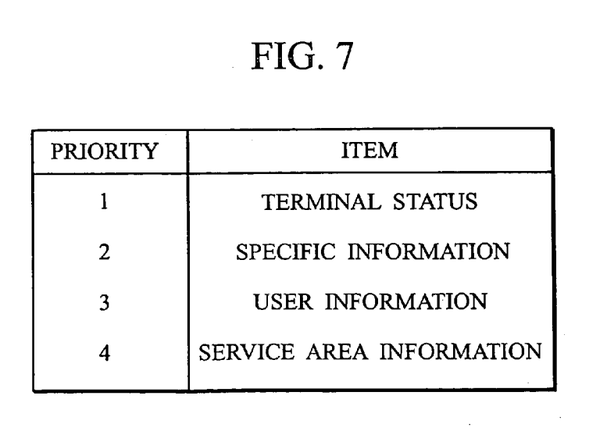
FIG. 7 is a diagram exemplarily illustrating a user information managing unit of the mobile terminal in the mobile communications system according to the first to fourth embodiments of the present invention.

For example, in the user information managing unit 13 shown in FIG. 7, selection of a wireless system based on the mobile terminal status (terminal status) is given Priority "1". Selection of a wireless system based on the specific information is given Priority "2". Selection of a wireless system based on the user information (such as a frequency of incoming call reception of the mobile terminal 10) is given Priority "3". Selection of a wireless system based on the service area information of the wireless systems is given Priority "4".

In this case, when a wireless system selected based on the mobile terminal status (terminal status) is inconsistent with a wireless system selected based on the specific information, the wireless system selected based on the mobile terminal status (terminal status) has priority.

The wireless system selecting unit 14 is configured to select a wireless system with which the mobile terminal performs the location registration from among multiple wireless systems (the first to third wireless systems), based on at least one of the mobile terminal status managed by the terminal status managing unit 11, the user information (the location information or the incoming call frequency of the mobile terminal) managed by the user information managing unit 13, and the service area information of the wireless system.

Alternatively, the wireless system selecting unit 14 may be configured to select a wireless system associated with the specific information as a wireless system with which the mobile terminal performs the location registration, when the specific information is transmitted together with the broadcast information from the base station BSa, BSb or BSc.

In other words, when detecting that the mobile terminal 10 is in a specific location, the wireless system selecting unit 14 can select a specific wireless system with which the mobile terminal 10 performs the location registration.

There is a possibility in that the user of the mobile terminal 10 can utilize a second wireless system capable of providing low-price high-speed communication services in the home of the user. In this case, the wireless system selecting unit 14 stores determination logic of selecting the second wireless system when detecting specific information showing that the mobile terminal 10 is located at home, so that the user can use the second wireless system provided by an ISP or the like only when he or she is at home.

The controlling unit 15 is configured to control the terminal status managing unit 11, the network information obtaining unit 12, the user information managing unit 13, the wireless system selecting unit 14 and the transceiver 16.

The controlling unit 15 can transmit a location registration request via the transceiver 16 and the antenna 17, thus constituting a location registration controller for performing location registration with a wireless system selected by the wireless system selecting unit 14.

The controlling unit 15 is configured to perform the location registration with a wireless system designated by the network control function layer 50, even after transmitting the location registration request designating a different wireless system.

Now the mobile communications control method according to this embodiment will be described with reference to FIGS. 8 and 9. Suppose here that the service area LA_A of the first wireless system A overlaps the service area LA_B of the second wireless system B in a single physical area.

In step 1000, the location information and user information management function component 55 manages the location registration area information of the mobile terminal 10 as "LA_A." That is, the mobile terminal 10 performs the location registration to the service area LA_A of the first wireless system A.

In step 1001, the base station BSa of the first wireless system A transmits broadcast information including the location registration area information "LA_A" and the service area information.

In step 1002, the base station BSb of the second wireless system B transmits broadcast information including the location registration area information "LA_B" and the service area information.

Here, the mobile terminal 10 is located in an area which is within the service area LA_A of the first wireless system A but is not within the service area LA_B of the second wireless system B, and therefore receives only the broadcast information of the first wireless system A.

In step 1003, the mobile terminal 10 enters an area which is within the service area LA_A of the first wireless system A and is also within the service area LA_B of the second wireless system B, and receives both the broadcast information of the first wireless system A and the broadcast information of the second wireless system B.

The network information obtaining unit 12 of the mobile terminal 10 obtains (detects) the service area information from the broadcast information of the second wireless system B.

In step 1004, the controlling unit 15 of the mobile terminal 10 obtains (detects) the mobile terminal status (terminal status such as a movement speed and remaining battery life) from the terminal status managing unit 11, and obtains (detects) the user information of the mobile terminal 10 (such as a frequency of incoming call reception of the mobile terminal 10) from the user information managing unit 13.

In step 1005, the controlling unit 15 selects a wireless system with which the mobile station 10 performs the location, based on at least one of the obtained mobile terminal status, the obtained user information, and the obtained service area information.

When the controlling unit 15 selects the first wireless system A as a location registration destination wireless system, that is, the controlling unit 15 determines that no location registration will be performed with the second wireless system B, the process is finished.

On the contrary, when selecting the second wireless system B as a location registration destination wireless system, that is, when determining that location registration will be performed with the second wireless system B, in step 1006, the controlling unit 15 transmits a location registration request including the mobile terminal ID and the location registration area information LA_B to base station BSb of the second wireless system B.

In step 1007, the base station BSb of the second wireless system B transmits the location registration request from the mobile terminal 10 to the location information and user information management function component 55 within the network control function layer 50.

In step 1008, the location information and user information management function component 55 updates the location registration area information of the mobile terminal 10 from "LA_A" to "LA_B", according to the received location registration request.

In step 1009, the location information and user information management function component 55 transmits a location registration answer showing that the location registration area information of the mobile terminal 10 has been updated to the base station BSb of second wireless system B.

In step 1010, the base station BSb of the second wireless system B transmits the location registration answer from the location information and user information management function component 55 to the mobile terminal 10.

Figure 9:
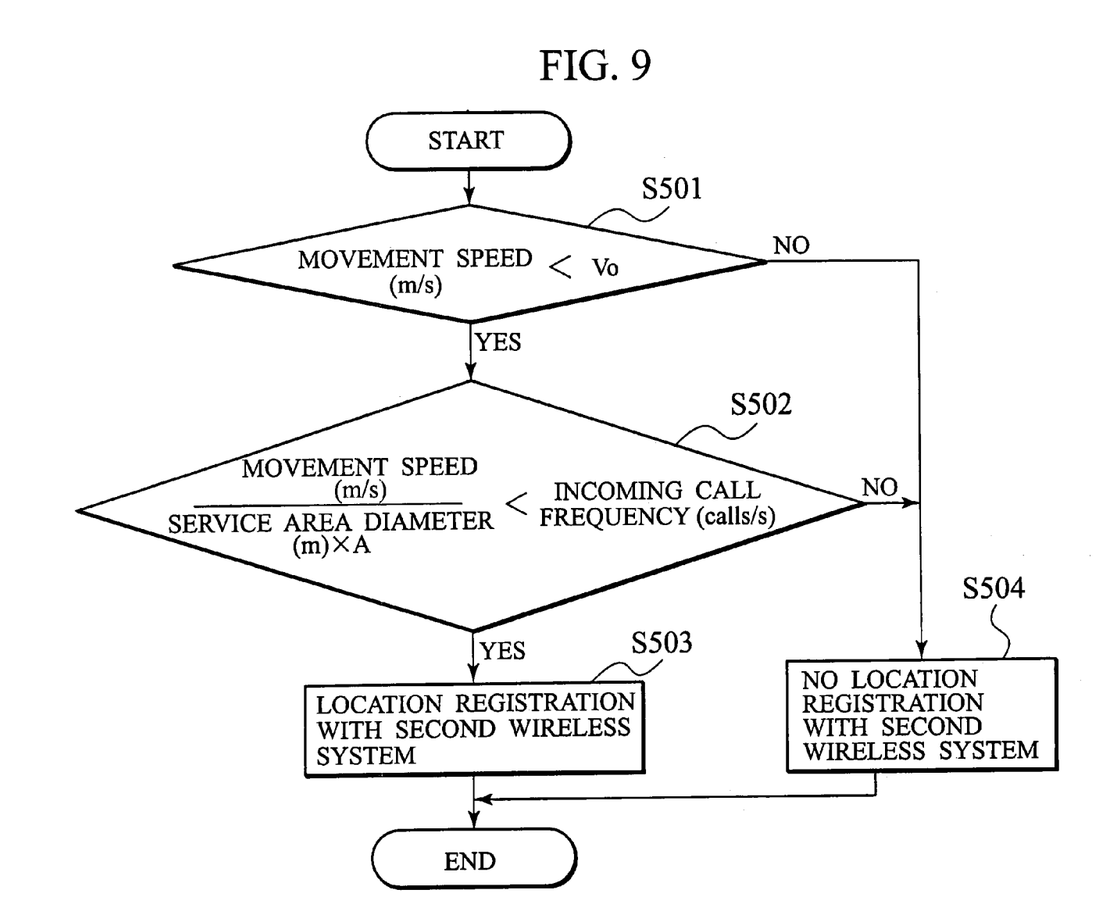
FIG. 9 is a flowchart exemplarily illustrating the operation of selecting a wireless system in the mobile communications control method according to the first embodiment of the present invention.

FIG. 9 exemplarily illustrates a method of selecting a location registration destination wireless system by the controlling unit 15.

With reference to FIG. 9, description will be made on an example in which the controlling unit 15 selects a location registration destination wireless system based on a movement speed (terminal status), incoming call frequency and service area information of the mobile terminal 10.

In step 501, the controlling unit 15 compares "movement speed (m/s) of the mobile terminal 10" with "predetermined speed V0".

Here, when it is determined that the value of "movement speed (m/s) of the mobile terminal 10" is smaller than the value of "predetermined speed V0", in step 502, the controlling unit 15 compares "movement speed of the mobile terminal 10 (m/s)÷(service area diameter (m)×parameter A)" with "incoming call frequency of the mobile terminal 10". Parameter A is adjusted according to the shape of the service area.

When it is determined that the value of "movement speed of the mobile terminal 10 (m/s)÷(service area diameter (m)×parameter A)" is smaller than the value of "incoming call frequency of the mobile terminal 10", in step 503, the controlling unit 15 selects the second wireless system B as a location registration destination wireless system.

In this case, the mobile terminal 10 will remain stationary or move at a relatively low speed. The mobile terminal 10 will stay for a relatively long period of time in the service area LA_B of the second wireless system B which has difficulty in coping with mobile terminal high-speed movement but is capable of providing high-speed communication services.

The location registration with the second wireless system B allows the mobile terminal 10 to be given high-speed communication services. This situation includes the case where the user of the mobile terminal 10 is at home or in an office.

On the contrary, when it is determined in step 501 that the value of "movement speed of the mobile terminal 10 (m/s)" is equal to or greater than the value of "predetermined speed V0", or when it is determined in step 502 that the value of "movement speed of the mobile terminal 10 (m/s)÷(service area diameter (m)×parameter A)" is equal to or greater than the value of "incoming call frequency of the mobile terminal 10", in step 504, the controlling unit 15 selects the first wireless system A as a location registration destination wireless system (that is, the controlling unit 15 does not select the second wireless system B).

In this case, the mobile terminal 10 will move at a high speed. It is highly probable that the mobile terminal 10 will stay for a short period of time in the service area LA_B of the second wireless system B which is capable of providing high-speed communication services but is unfavorable in mobility management, area coverage and battery saving, getting no incoming call within that period.

Thus the controlling unit 15 does not transmit a location registration request for the second wireless system B, avoiding transmission of a useless location registration request.

According to the mobile communications control method of this embodiment, an optimum wireless system with which the mobile terminal 10 performs location registration can be selected, based on the mobile terminal status, the location information of the mobile terminal, the incoming call frequency of the mobile terminal and the service area information of the wireless system, so that delay in starting communication can be avoided, and also useless location registration requests can be eliminated.

More specifically, the controlling unit 15 of the mobile terminal 10 performs location registration with an optimum wireless system selected by the wireless system selecting unit 14, thus avoiding delay in the start of communication and useless location registration requests by the mobile terminal 10.

Further, according to the mobile communications control method of this embodiment, location registration control efficiently utilizing advantages of different wireless systems in mobility management, area coverage, battery saving, high-speed communication service provision and so on can be performed, based on movement speed and remaining battery life of a mobile terminal 10.

Further, according to the mobile communications control method of this embodiment, the mobile terminal 10 performs location registration with a wireless system associated with the specific information transmitted with the broadcast information transmitted from the network control function layer 50, so that location registration control based on users' individual preferences or the like can be performed.

Second Embodiment of the Invention

Figure 10:
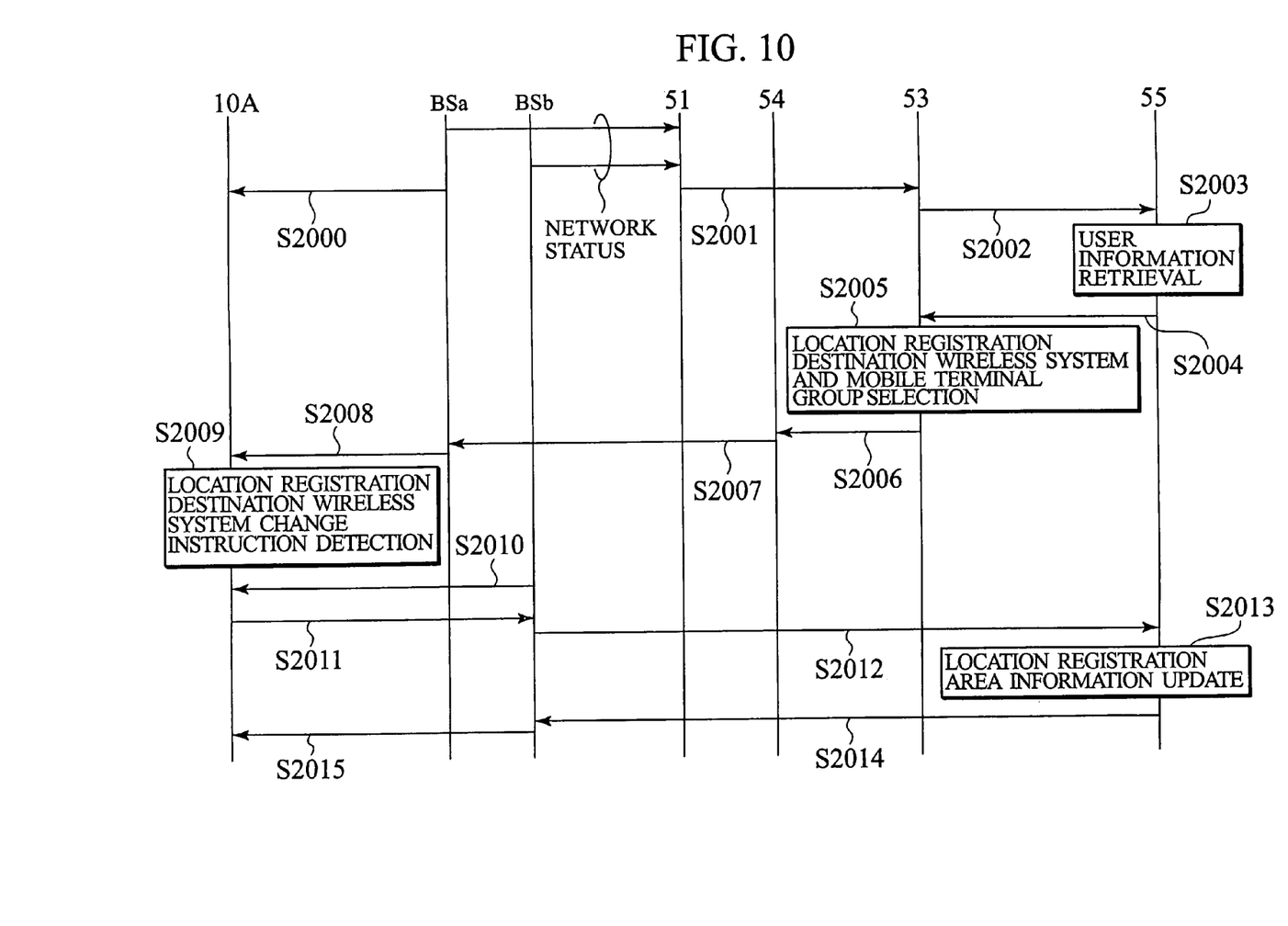
FIG. 10 is a sequence diagram illustrating a mobile communications control method according to the second embodiment of the present invention.

With reference to FIG. 10, a mobile communications control method according to a second embodiment of the present invention will be described. Components identical with those in the first embodiment are denoted by identical reference numerals and will not be described in detail below.

The mobile communications control method of this embodiment allows for mobile communications control even in the case where a large number of mobile terminals 10 converge on a certain place because of an event or the like (situation shown in FIG. 2).

That is, in a conventional location registration control method, in a situation shown in FIG. 2, there is a possibility in that all mobile terminals 10 constituting a mobile terminal group 10A will simultaneously perform location registration with a first wireless system A.

As a result, such a situation can occur that traffic in a service area LA_A of the first wireless system A is dense while traffic in a service area LA_B of a second wireless system B located in the same physical area is thin. The mobile communications control method according to this embodiment has been invented to prevent such situations.

In step 2000, a base station BSa of the first wireless system A transmits broadcast information to all the mobile terminals 10 belonging to the mobile terminal group 10A which have performed location registration with the first wireless system A.

The base station BSa of the first wireless system A and a base station BSb of the second wireless system B notify their respective current network statuses to a network status management function component 51 of a network control function layer 50.

In step 2001, the network status management function component 51 notifies a wireless system select function component 53 of the network statuses given by the first and second wireless systems.

In step 2002, the wireless system select function component 53 detects from the given network statuses that the first wireless system A is congested, and transmits a user information acquisition request to a location information and user information management function component 55 for obtaining user information (group ID) of the mobile terminals 10 having performed the location registration with the first wireless system A.

In step 2003, the location information and user information management function component 55 retrieves the user information requested by the user information acquisition request.

In step 2004, the location information and user information management function component 55 transmits a user information acquisition answer including the retrieved user information to the wireless system select function component 53.

In step 2005, the wireless system select function component 53 selects the mobile terminal group 10A and a location registration destination wireless system (the second wireless system B) of the mobile terminals 10 belonging to the mobile terminal group 10A, based on the notified network status and the obtained user information.

In step 2006, the wireless system select function component 53 transmits a location registration destination wireless system change instruction including information showing the selected mobile terminal group 10A (group ID) and information showing the second wireless system, to the wireless system instruction function component 54.

In step 2007, the wireless system instruction function component 54 transmits the location registration destination wireless system change instruction to the base station Bsa of the first wireless system A.

In step 2008, the base station BSa of the first wireless system A transmits the location registration destination wireless system change instruction to the mobile terminals 10 of the mobile terminal group 10A.

In step 2009, the network information obtaining units 12 of the mobile terminals 10 detect the location registration destination wireless system change instruction transmitted from the base station Bsa of the first wireless system A.

In step 2010, the network information obtaining units 12 receive broadcast information transmitted from the base station BSb of the second wireless system B.

In step 2011, the controlling units 15 of the mobile terminals 10 transmit location registration requests including the mobile terminal IDs and location registration area information LA_B, to base station BSb of the second wireless system B, according to the location registration destination wireless system change instruction and the broadcast information.

Figure 8:
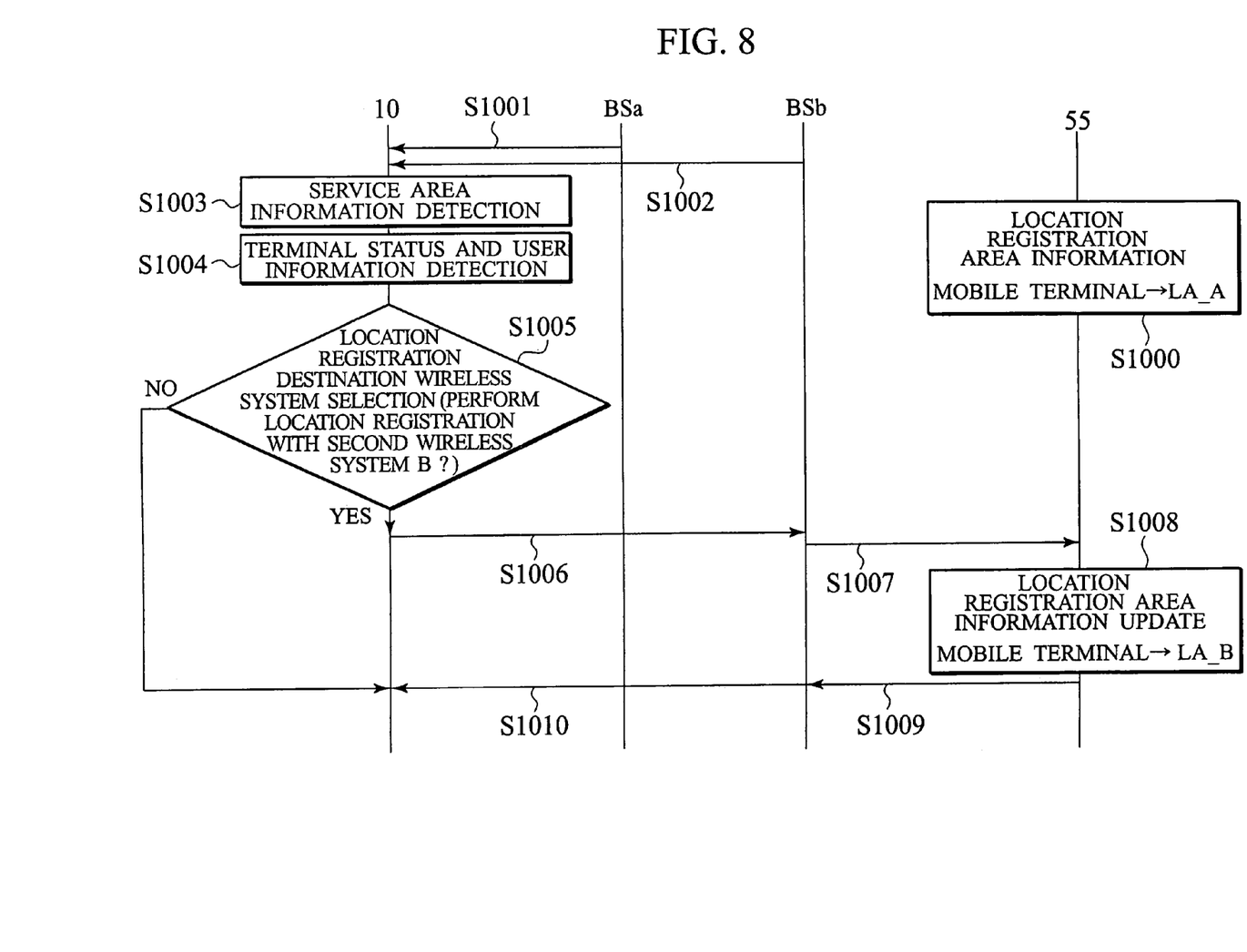
FIG. 8 is a sequence diagram illustrating a mobile communications control method according to the first embodiment of the present invention.

The operation of the following steps 2012 to 2015 is identical to that of steps 1007 to 1010 in FIG. 8.

According to the mobile communications control method of this embodiment, the mobile terminals 10 can select a wireless system with which the mobile terminals 10 perform location registration, based on the network status, so that traffic concentration can be avoided in the network.

According to the mobile communications control method of this embodiment, in a given case, the wireless system instruction function component 54 of the network control function layer 50 instructs a selected optimum wireless system to the mobile terminals 10, so that traffic concentration, delay in starting communication and useless location registration requests by the mobile terminals 10 can be avoided in the network.

Further, according to the mobile communications control method of this embodiment, the wireless system select function component 53 of the network control function layer 50 selects a wireless system with which the mobile terminals 10 perform location registration for each group, so that mobile terminals 10 to perform location registration can be appropriately and easily assigned to given wireless systems according to the traffic status in the network.

Third Embodiment of the Invention

Figure 11:
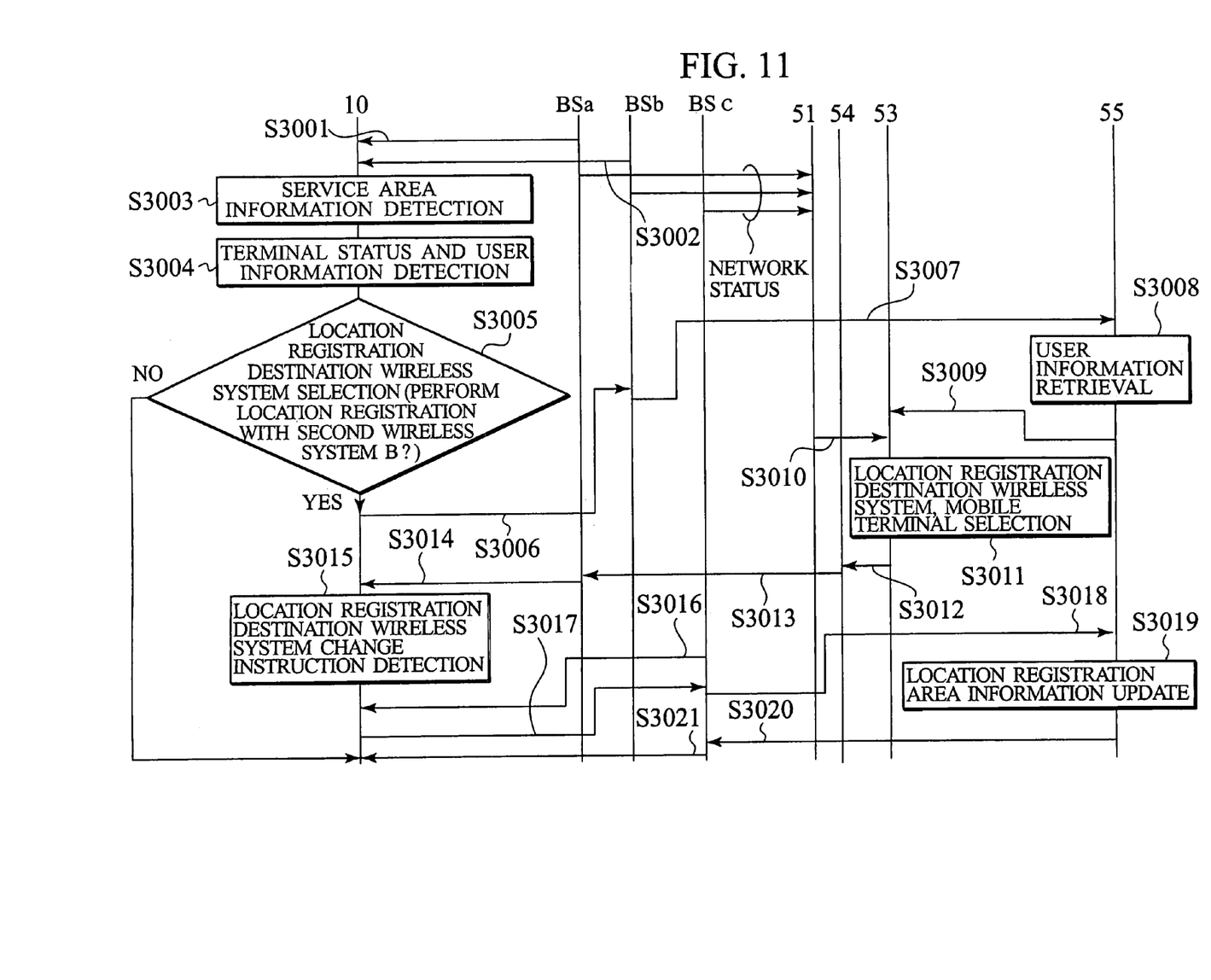
FIG. 11 is a sequence diagram illustrating a mobile communications control method according to the third embodiment of the present invention.

With reference to FIG. 11, a mobile communications control method according to a third embodiment of the invention will be described. Components identical with those in the first embodiment are denoted by identical reference numerals and will not be described in detail below.

Operation through steps 3001 to 3007 is identical with that through steps 1001 to 1007 in FIG. 8.

In step 3008, the location information and user information management function component 55 retrieves the user information (such as a frequency of incoming call reception of a mobile terminal 10) associated with a mobile terminal ID included in the location registration request transmitted from the base station BSb of the second wireless system B.

In step 3009, the location information and user information management function component 55 transmits the retrieved user information to a wireless system select function component 53.

In step 3010, the network status management function component 51 of the network control function layer 50 notifies the wireless system select function component 53 of the current network status notified from first to third wireless systems A to C.

In step 3011, the wireless system select function component 53 selects a wireless system (e.g., the third wireless system C) different from the wireless system specified in the location registration request as a location registration destination wireless system of the mobile terminal 10, based on the received network status and the obtained user information.

In step 3012, the wireless system select function component 53 transmits a location registration destination wireless system change instruction including information showing a selected mobile terminal 10 (mobile terminal ID) and information showing the third wireless system (wireless system information) to a wireless system instruction function component 54.

In step 3013, the wireless system instruction function component 54 transmits the location registration destination wireless system change instruction to a base station BSa of the first wireless system A.

In step 3014, the base station BSa of the first wireless system A transmits the location registration destination wireless system change instruction to the mobile terminal 10.

In step 3015, the network information obtaining unit 12 of the mobile terminal 10 detects the location registration destination wireless system change instruction transmitted from the base station BSa of the first wireless system A.

In step 3016, the network information obtaining unit 12 receives broadcast information transmitted from the base station BSc of the third wireless system C.

Operation of the following steps 3017 to 3021 is identical with that of steps 2011 to 2015 in FIG. 10.

According to the mobile communications control method of this embodiment, even when the mobile terminal 10 selects a wireless system for location registration, the wireless system select function component 53 of the network control function layer 50 can select a wireless system different from the wireless system specified by the mobile terminal 10, based on the result of overall monitoring of the entire network.

The selection of a wireless system by the network control function layer 50 is given priority, thereby to be able to perform optimum location registration control for the entire network.

Fourth Embodiment of the Invention

Figure 12:
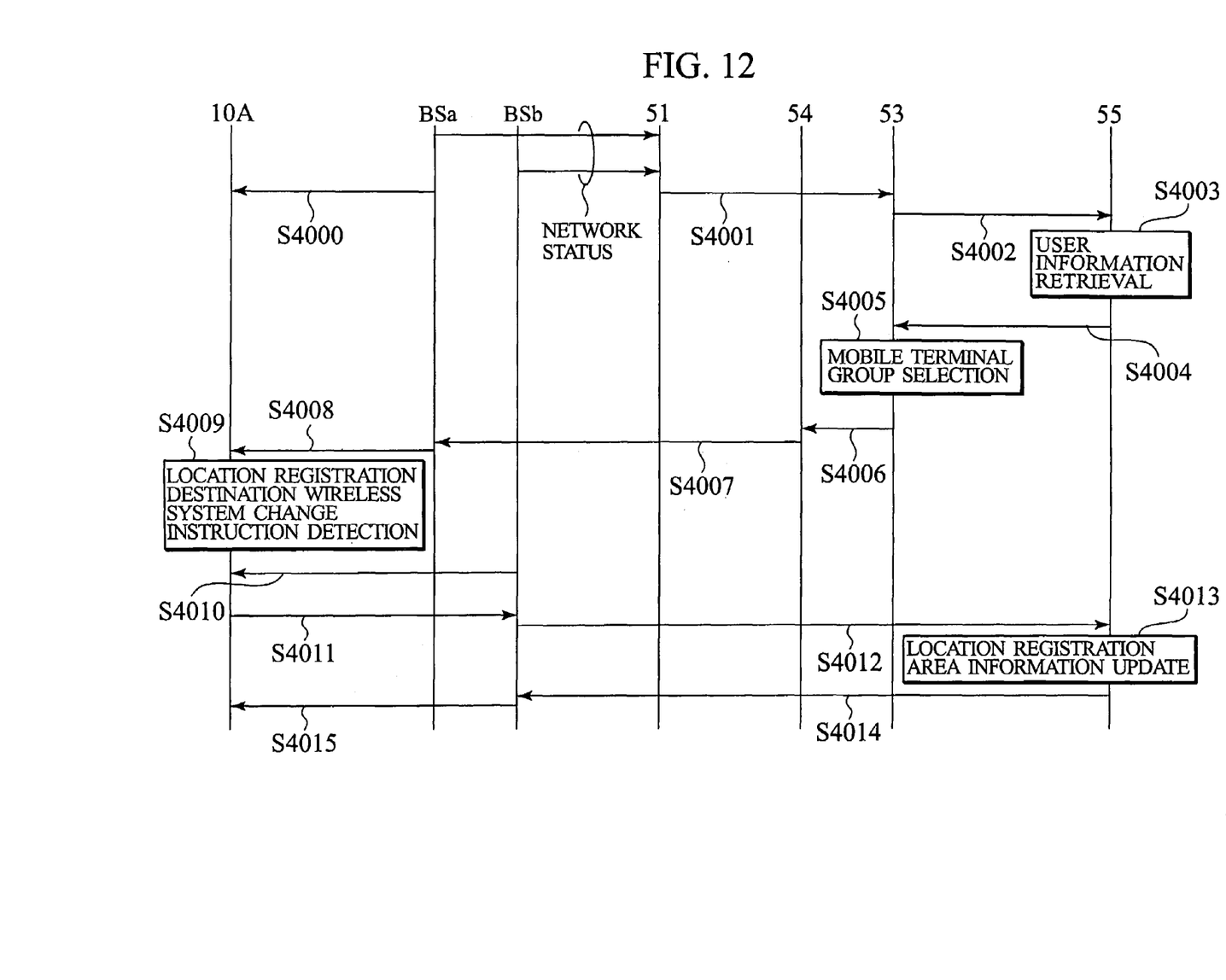
FIG. 12 is a sequence diagram illustrating a mobile communications control method according to the fourth embodiment of the present invention.

With reference to FIG. 12, a mobile communications control method according to a fourth embodiment of the present invention will be described. Components identical with those in the first embodiment are denoted by identical reference numerals and will not be described in detail below.

The mobile communications control method of this embodiment is, as shown in FIG. 12, identical with the mobile communications control method according to the second embodiment except that a location registration destination wireless system change instruction does not include information specifying a location registration destination wireless system in steps 4006 to 4008.

According to the mobile communications control method of this embodiment, the network control function layer 50 does not need to select a wireless system with which location registration is performed when instructing mobile terminals 10 that a wireless system for location registration should be changed, that is, it is only required to transmit a location registration change moment, resulting in a reduced load of the control system in location registration control.

<Modification>

In the mobile communications control methods of the above embodiments, the mobile terminal 10 performs the location registration with a single wireless system. However, the present invention is not limited thereto and is also applicable to the case where the mobile terminal 10 performs the location registration with a plurality of wireless systems.

As described above, the present invention can provide a mobile communications control method, a control system and a mobile terminal which allow for the avoidance of traffic concentration on a single wireless system, the selection of an optimum wireless system by a mobile terminal at the start of communication without delay, the elimination of traffic of useless location registration requests, and the provision of communications environment according to a mobile terminal user's preference or the like.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A mobile communications control method of controlling mobile communication by a mobile terminal in a network in which a plurality of wireless systems are available, the method comprising:
   location registering the mobile terminal with a location registration area associated with one of the plurality of wireless systems, said location registering including
      transmitting broadcast information including location registration area information of the plurality of wireless systems,
      receiving a location registration request including location registration area information from the mobile terminal,
      updating location registration area information of the mobile terminal according to the location registration area information from the location registration request of the mobile terminal; and
   selecting, at a network control function layer, a wireless system as a selected wireless system, on which to perform location registration, said location registration including associating the mobile terminal with a location area of the selected wireless system, from among the wireless systems, based on at least one of a status of the network, a status of the mobile terminal, location information of the mobile terminal, a frequency of incoming call reception of the mobile terminal, and service area information of the wireless systems.

2. A control system for controlling mobile communication by a mobile terminal in a network in which a plurality of wireless systems are available, the system comprising:
   a network status management function component, at a network control function layer, configured to manage a status of the network, the network including the plurality of wireless systems;
   a network information broadcast function component, at the network control function layer, configured to broadcast location area information of the plurality of wireless systems of the network;
   a location information and user information management function component, at the network control function layer, configured to manage location information and user information;
   an instructor, at the network control function layer, configured to instruct the mobile terminal to the selected wireless system;
   a selector, at the network control function layer, configured to select from among the wireless systems, a wireless system with which the mobile terminal performs location registration as the selected wireless system, based on at least one of a status of the network, a status of the mobile terminal, location information of the mobile terminal, a frequency of incoming call reception of the mobile terminal, and service area information of the wireless systems.

3. The control system as set forth in claim 2, wherein the selector is configured to select a wireless system different from a wireless system specified in a location registration request from the mobile terminal.

4. The control system as set forth in claim 2, wherein the instructor is configured to instruct the mobile terminal to change a wireless system with which the mobile terminal performs location registration.

5. The control system as set forth in claim 2, further comprising a group manager configured to manage mobile terminals in groups; wherein,
   the selector is configured to select, from among the wireless systems, a wireless system with which mobile terminals belonging to a given group perform location registration, based on at least one of the status of the network, the status of each mobile terminal, location information of each mobile terminal, the frequency of incoming call reception of each mobile terminal, and the service area information of the wireless systems; and
   the instructor is configured to instruct the selected wireless system to the mobile terminals belonging to the given group.

* * * * *